United States Patent [19]

Zeller et al.

[11] Patent Number: 5,050,638
[45] Date of Patent: Sep. 24, 1991

[54] DEVICE FOR CONTROLLING A VOLUMETRIC RATE OF FLOW IN A GUIDE TUBE

[75] Inventors: Adalbert Zeller; Hermann Kurrle; Wolfgang Ruf, all of Kolbingen, Fed. Rep. of Germany

[73] Assignee: Schako Metallwarenfabrik, Kolbingen, Fed. Rep. of Germany

[21] Appl. No.: 529,960

[22] Filed: May 29, 1990

[30] Foreign Application Priority Data

May 29, 1989 [DE] Fed. Rep. of Germany ....... 3917360

[51] Int. Cl.⁵ .................. F16K 37/00; F16K 31/04
[52] U.S. Cl. ........................ 137/553; 251/129.11; 251/250; 251/250.5
[58] Field of Search ............ 251/129.11, 129.12, 251/129.13, 250, 250.5; 137/553, 556; 98/121.2

[56] References Cited

U.S. PATENT DOCUMENTS

| | | | |
|---|---|---|---|
| 842,961 | 2/1907 | Kewley | 137/553 X |
| 2,393,482 | 1/1946 | Smith | 251/129.11 X |
| 2,912,870 | 11/1959 | Green | 251/250 X |
| 4,327,894 | 5/1982 | Ewing et al. | 251/129.11 X |
| 4,401,260 | 8/1983 | Grant | 251/129.11 X |
| 4,545,363 | 10/1985 | Barchechat et al. | 251/129.11 X |
| 4,556,169 | 12/1985 | Zervos | 251/129.11 X |

Primary Examiner—John Rivell
Attorney, Agent, or Firm—Bachman & LaPointe

[57] ABSTRACT

In a device for controlling a volumetric rate of flow in a guide tube (1), in particular for controlling the volumetric flow of air in a ventilation system or an air-conditioning plant, an adjusting flap (5) is to be arranged variably, in particular rotatably about an axis of rotation (6), in the guide tube (1). In this case, the guide tube (1) is assigned an adjusting device (3) for the adjusting flap (5) and the adjusting device is assigned a controller (4) which can be controlled by a control unit, in particular a room thermostat.

3 Claims, 1 Drawing Sheet

DEVICE FOR CONTROLLING A VOLUMETRIC RATE OF FLOW IN A GUIDE TUBE

BACKGROUND OF THE INVENTION

The present invention relates to a device for controlling the volumetric rate of flow of air in a conduit, in particular for controlling the flow of air in a ventilation system or an air-conditioning plant employing an adjusting flap being arranged variably, in particular rotatably about an axis of rotation, in the conduit.

The essential object of ventilation systems is to introduce fresh, purified air into, for example, working and lesire rooms and to remove consumed and polluted air therefrom. Depending on the desired requirement, these systems can additionally be used for heating, cooling, moisturizing and demoisturizing purposes.

Since the well-being of man depends considerably on these ventilation systems or air-conditioning plants, their control is of considerable importance. A volumetric flow controller of the type described above is disclosed, for example, in the German Patent Specification 3,336,911. There a corresponding adjusting flap is controlled by a device for the measurement of the flow of air, collecting tubes with flow openings being provided arranged distributed over the flow cross-section of the gas guide tube, into which collection tubes the air flows. In this case, all the flow receiving openings are directed against the flow, the flow being conducted to collecting tubes which are connected to a tubular collecting housing. The axis of said collecting housing extends parallel to the axis of the gas guide tube. Furthermore, it is assigned a corresponding measurement probe. This device has proved to be very expedient in practice, but the control of the adjusting flap takes place via the relatively complicated measuring system.

Accordingly, it is the principal object of the present to develop a device of the type mentioned above by means of which a far more direct actuation of the adjusting flap is possible which, additionally, works in a simple manner and without complications or wear.

SUMMARY OF THE INVENTION

The foregoing object is achieved by the present invention wherein the conveying conduit has an adjusting device for the adjusting flap and the adjusting device is provided with a controller which can be controlled by a control unit, in particular a room thermostat.

The adjusting device and controller are preferably situated outside the conduit so that they are not influenced by the volumetric flow of air flowing through the conduit. By this means, there is also no occurrence of contaminations or the like on the control unit.

The control is effected exclusively via the room thermostat such that, here, a direct actuation of the controller appears to be possible. The room thermostat then relays corresponding switching signals to the controller when the room temperature is too low or too high. By this means, the adjusting flap is then correspondingly closed or opened via the adjusting device. This is very simple and, in practice, does not pose any complications. Maintenance is only necessary in extremely rare cases.

The adjusting device is preferably coupled to the controller via gear elements. In this case, both the adjusting device and the controller are seated together on the conduit such that a compact unit is formed.

In a preferred embodiment of the present invention, a toothed wheel or the like, on which a toothed strip acts directly, which toothed strip is associated with the adjusting device and can be displaced linearly, can be seated on the axis of rotation of the adjusting flap. However, other gear elements are also possible such, as for example, a chain connected to the linearly moveable toothed strip via corresponding deflection rollers. No limits to the inventive concept are intended to be set by the gear elements employed.

Preferably, however, the gear elements are to be assigned a shock absorber via which the volumetric flow controller can be exactly adjusted with very high accuracy of control then being achieved.

If a toothed strip is provided as the gear element, a semi-circular toothed disk, a toothed wheel or the like, the toothing of which acts on a toothing of this toothed strip and thus causes the linear movement of the toothed strip is to be connected to the shaft of a drive associated with the controller. Here too, however, other couplings are conceivable.

An electric motor which can be switched from 1 to 10 volts is preferably used as the drive for the controller.

BRIEF DESCRIPTION OF THE DRAWINGS

Further advantages, features and details of the present invention emerge from the following description of a preferred exemplary embodiment described with reference to the drawing, wherein.

DETAILED DESCRIPTION

Figure 1:
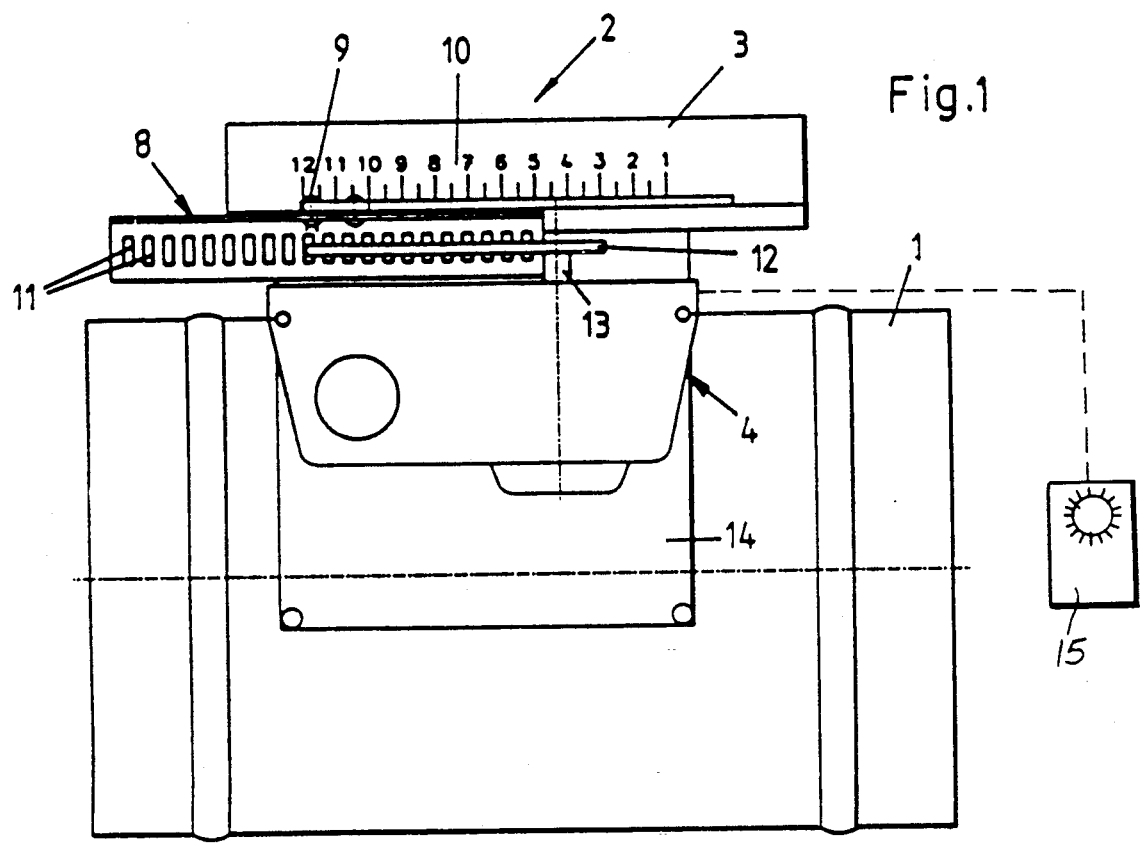
FIG. 1 is a lateral view of a volumetric flow controller according to the invention, mounted on a conduit of a ventilation system.

According to FIG. 1, a volumetric flow controller 2 is seated on a conduit 1 of a ventilation or air-conditioning system which is not illustrated in detail. This volumetric flow controller 2 consists essentially of an actual adjusting device 3 and a controller 4.

Figure 2:
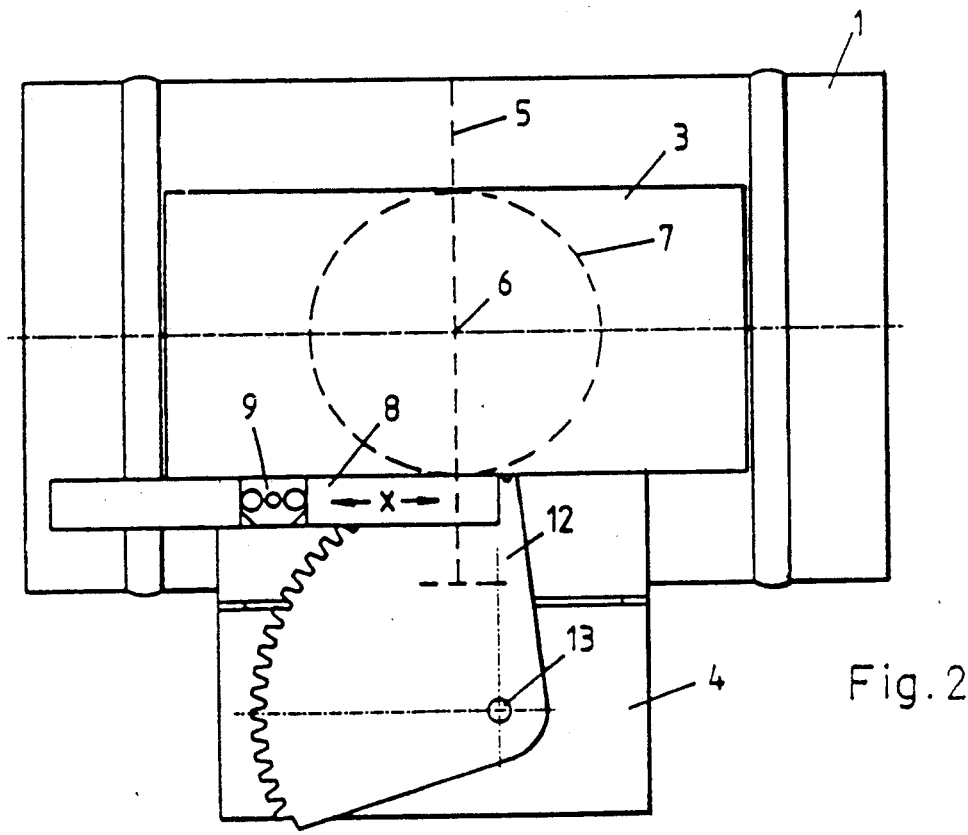
FIG. 2 is a plan view of the volumetric flow controller according to FIG. 1.

Operated by the adjusting device 3 is an adjusting flap 5, illustrated by dashed lines in FIG. 2, which can, in particular, be round or oval depending on the cross-section of the tube section. In the illustrated case, the adjusting flap 5 rotates about an axis of rotation 6 and is connected to the controller 4 via corresponding gear elements. A toothed wheel 7, for example, can be placed on the axis of rotation 6, which toothed wheel is likewise only indicated in the present exemplary embodiment by dashed lines. In this case, the toothed wheel 7 has an external toothing which is meshed by corresponding teeth of a toothed strip 8.

If this toothed strip 8 is displaced in direction x, the position of the adjusting flap 5 can be controlled by rotation of the toothed wheel 7 via the axis of rotation 6.

It should be appreciated however that other gear elements are also conceivable here, such as, for example, a corresponding connection chain, only one chain link 9 being indicated here, which then connects the toothed strip 8 via corresponding deflection rollers either to the toothed wheel 7 or to another gear part for rotation of the axis of rotation 6.

According to the invention, a shock absorber, not illustrated in detail, is also associated with the gear element and the shock absorber can regulate the activity of the gear elements exactly.

Provided above the toothed strip 8 is a scale 10 on which the position of the adjusting flap 5 can be read off.

Furthermore, the toothed strip 8 has a further toothing 11 on which a semi-circular toothed disk 12 acts. This semi-circular toothed disk is connected via a further axis of rotation 13 to a motor operator provided in the controller 4, the controller 4 itself being flanged on to the adjusting device 3 and the entire volumetric flow controller 2 being connected to the conduit 1 via a semi-circular connection tab 14.

Instead of the semi-circular toothed disk 12, another connection element to the toothed strip can also be provided such as, for example, a toothed wheel or a rack. Two toothed strips working in opposite directions would also be suitable.

In the case of the motor, it is preferably an electric motor which can be switched from 1 to 10 volts. The gear units inside the adjusting device are matched very accurately to this motor, the controller being able to be adjusted exactly due to the mounted shock absorber and the accuracy of control being very high (difference below 5%).

The advantage of this volumetric flow controller lies, in particular, in the fact that neither a cross-wire nor an additional control unit is needed. Solely an adjusting flap, either round or oval, and a commercial motor (electric or pneumatic), which can be controlled from 0 to 10 volts, are required. The control of the controller is effected directly by the room thermostat 15, the room thermostat 15 relaying corresponding signals when the room temperature is too low or too high. By this means, the motor operator is driven which closes or opens the adjusting flap via the gear parts of the adjusting device.

The volumetric flow controller is also extremely easy to maintain since no contaminations of a cross-wire or of a control unit are possible.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a ventilation system having a conduit for transporting air and an adjustable flap valve pivotably mounted about an axis within said conduit for controlling the volumetric rate of flow of air through said conduit, a device for pivoting said flap valve for adjusting the volumetric rate of flow of air through said conduit in response to a sensed condition comprises: adjusting means mounted on said conduit, control means mounted on said adjusting means, said control means includes motor means responsive to a sensed condition sensed by a remote sensing means for driving a first driven means, said adjusting means includes a second driven means associated with said flap valve for pivoting said flap valve about said axis and coupling means for coupling said first driven means to said second driven means such that said flap valve is adjusted upon said sensing means sensing a change in said sensed condition wherein said first driven means comprises a geared disk which is seated on a shaft of the motor means, said second driven means comprises a geared wheel and said coupling means comprises a geared member wherein said geared member is positioned between and engages said first driven means and said second driven means such that linear displacement of the geared member by said first driven means drives said second driven means for rotating said adjustable flap valve and provides position indication of said adjustable flap valve.

2. A device according to claim 1 wherein the motor means is an electric motor which can be controlled from 1 to 10 volts.

3. A device according to claim 1 wherein said first driven means comprises a rotatably driven disk and said second driven means comprises a rotatably driven wheel.

* * * * *